DIETZ & DUNHAM.
Mowing Machine.
No. 12,584.    Patented March 27, 1855.
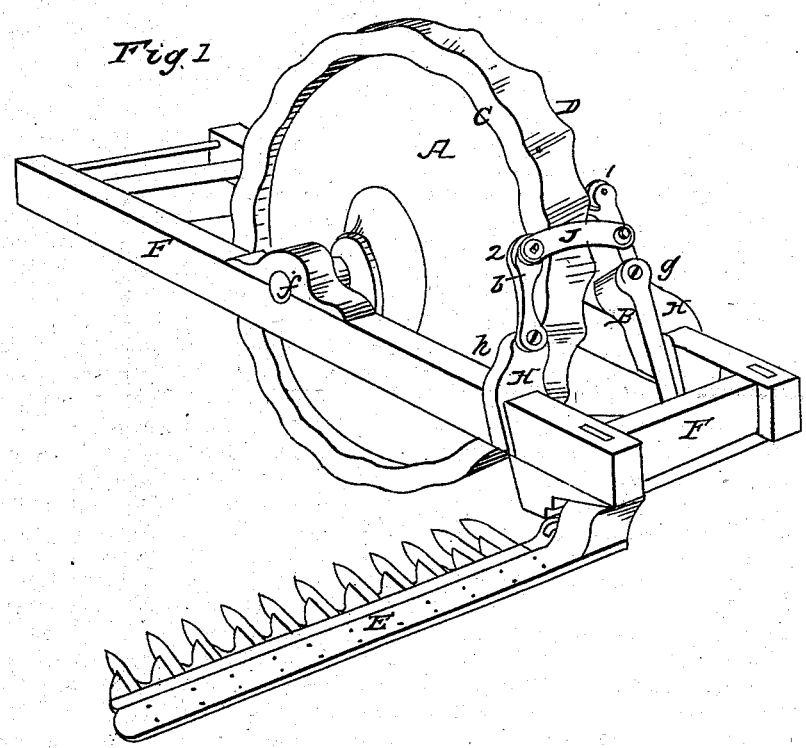
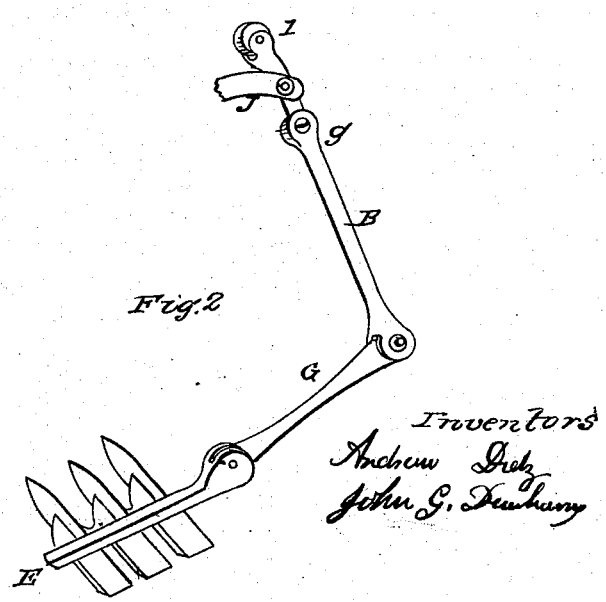

UNITED STATES PATENT OFFICE.

A. DIETZ AND J. G. DUNHAM, OF RARITAN, NEW JERSEY.

IMPROVEMENT IN GRAIN AND GRASS HARVESTERS.

Specification forming part of Letters Patent No. 12,584, dated March 27, 1855; antedated January 2, 1855.

*To all whom it may concern:*

Be it known that we, ANDREW DIETZ and JOHN G. DUNHAM, of Raritan, Somerset county, and State of New Jersey, have invented a new and useful Improvement in the Construction of Mowing and Reaping Machines; and we do hereby declare that the following is a full and exact description thereof, reference being had to the accompanying drawings, and to the letters of reference marked thereon.

Figure 1 shows the form of the driving or ground wheel and the manner in which motion is imparted to the sickle through the lever B, and Fig. 2 shows the manner of connection between the lever B and the sickle E.

The nature of our invention or improvements consists in a peculiar construction of the cams of the driving-wheel for transferring motion or power to the sickle directly from the driving or ground wheel of the machine, and in their combination with certain levers hereinafter described.

The frame F, which sustains the wheel A and also the sickle, is about six feet long and a foot and a half or two feet wide, though this exact size is not material, and should be made of strong timber, its strength being its most important feature. The driving-wheel A, whose axle runs upon the frame F in gudgeons $ff$, is about three feet in diameter, which is found to be the most convenient size, and is of cast-iron with a strong hub and heavy spokes, and has a solid tire or felly about two inches deep and eight inches wide or broad. The peculiarity of this wheel consists in its cam-shaped surfaces C and D, and by means of which a vibratory motion is given to the sickle E. Upon one side, D, the cam-surface is so constructed that the distance between the lowest and highest point of the cam shall be about an inch and a quarter, or sufficient to give through the lever B the necessary vibratory motion to the sickle. The length of each cam has to correspond with the cutting-range of one vibration of the cutter-bar, so that the machine shall travel neither more nor less than the cutter-bar by its construction can really cut during the progress of the machine. In the present case the perpendicular depth of the teeth of the cutter-bar is three inches. Consequently they can at every vibration cut neither more nor less than six inches. Every cam D must therefore have a length of six inches, which, for a wheel assumed to be three feet in diameter, will give eighteen cams, and consequently eighteen vibrations of the cutter-bar, during the traveling of the latter over nine feet of ground. The overlooking of this proportion in all the harvesters built heretofore is the real reason of their partial and in some cases total failures. It must be evident to every expert in mechanics that a cutter-bar traveling over more ground than by its construction and the movement communicated to it it can cut will not only leave continually a part of the grain or grass uncut, but will, by fouling it, create a continual impediment in its own progress and a strain or side draft as much injurious to the team as to the machine itself, while a cutter-bar traveling over less ground than by its construction it could cut will waste power without effect and wear the machinery to no purpose. The correspondence of the length of the cam with the cutting-range of the cutter-bar is therefore of paramount importance and the real key to the efficiency of harvesters in general. Upon the other side, C, the depression and elevation of the cam differ only about half an inch, this being sufficient to give motion to the short lever $b$, and, by the use of the wheel 2, which will be hereinafter described, a motion equal to that given to the long lever B. The two levers B and $b$, at their ends which press against the cam-surfaces C and D, have each a wheel, (marked 1 and 2,) which follows the cams, preventing friction, but at the same time equally well giving motion to the levers. The wheel 1, following the deepest cam, is about two inches in diameter, while the wheel 2, running in the opposite and shallow cam, may be over four inches in diameter. By this arrangement of cam-surfaces of different forms and the use of friction-wheels of different diameters (the larger wheel running in the shallower cam) the levers B and $b$ have nearly the same motion, and the power is used at a better advantage, the wheels and levers acting without binding, and each overcoming any tendency in the other to stop or change speed at its dead or center point. The cam-surfaces C and D are so constructed, as will be seen by reference to the model and drawings, that the highest point of the cam on one side of the wheel A is not exactly opposite the highest point of the cam upon the other; but they vary so that the friction-wheel in one lever shall have actually begun to descend the curve before the wheel in the other lever shall have reached the highest point. When the different cam-surfaces are made, as above described, with different curves, and are thus relatively placed in respect to each other, and the levers B and b act upon these cams in the manner represented, the whole action of the wheel and its cam-surfaces upon the levers moving the sickle is easy and effectual, and the parts do not bind upon each other or interfere with each other's motions. It is believed that the shape and arrangement before described of these cam-surfaces will be as good and desirable as any, securing as complete and perfect action to the sickle with as little loss from friction and similar causes; but the particular shape of the cam-surface is not material, as it can be varied with a corresponding change in the size of the several friction-wheels in the ends of the levers, the particular bearing-points of the levers B and b being changed also, if desired, without interfering with the great feature of our improvement, imparting motion to the sickle directly from the driving-wheel.

Back of the wheel A, and to each side of the frame F, are fixed strong supports (H H, or they may be in the shape of a cast-iron yoke connecting the opposite sides of F,) to which are attached by their respective fulcrums g and h the two levers B and b, which are made of iron, strong and powerful. The lever B is about six inches from its point of contact with the wheel to its fulcrum g, and about fifteen or sixteen inches from the fulcrum to its lower end. The long arm of this lever will, however, vary according to the length of cut of the sickle, and will necessarily be somewhat longer or shorter, according as it may be attached to one or another mower and reaper. The lever b has its fulcrum h about two inches lower down than the fulcrum of the lever B, and is usually in length about the same with the short arm of that lever. Their respective fulcrums being not in the same line, these levers, as will be observed, do not rest upon the wheel directly opposite to each other; but this arrangement does not interfere with their natural movements. The two levers B and b are connected together by means of the cross-bar J, which secures a constant vibratory motion to the sickle. The sickle E is attached to the lever B by the strong connecting-bar G, which is generally about a foot long, though its length may be varied, as desired, and according to circumstances.

From the peculiar construction of our driving-wheel and the connection and arrangement of the levers B and b with this wheel and the sickle E it is evident that every motion given to these levers from the cam-surfaces of the wheel A is transferred directly to the sickle E and without the necessity or use of any gearing such as is necessarily made use of in ordinary mowers and reapers, and without any mechanical arrangement except the simple lever. A great quantity of power, which is generally lost or consumed by friction, is thus saved, while at the same time the cost of the machine is much reduced and its action much simplified, and it is less liable to get out of order, and will perform a greater amount of labor with a given amount of power. At a speed of three miles an hour, which a horse can easily sustain, the driving-wheel revolves about thirty times a minute, and gives about five hundred and forty vibrations to the sickle in the same lenth of time.

What we claim as our invention, and desire to secure by Letters Patent, is—

1. Constructing the cams C and D upon driving-wheel A of a length exactly corresponding to the cutting-range of a single stroke of the knife during the advance and return of the cutter-bar, substantially as and for purpose above set forth and described.

2. The difference in the relative depths of the cams C and D, in combination with the linked levers B and b, arranged and operating substantially as above set forth and described.

3. Arranging the highest elevation of each cam upon the wheel A at a point between the highest elevation and lowest depression of a cam upon the other side of the wheel, substantially as above set forth.

ANDREW DEITZ.
JOHN G. DUNHAM.

Witnesses:
SAMUEL S. HARTWELL,
I. V. TRUMP.